Aug. 11, 1970 J. R. GARDNER 3,523,377
INSTRUCTIONAL GAMING APPARATUS
Filed Feb. 26, 1968
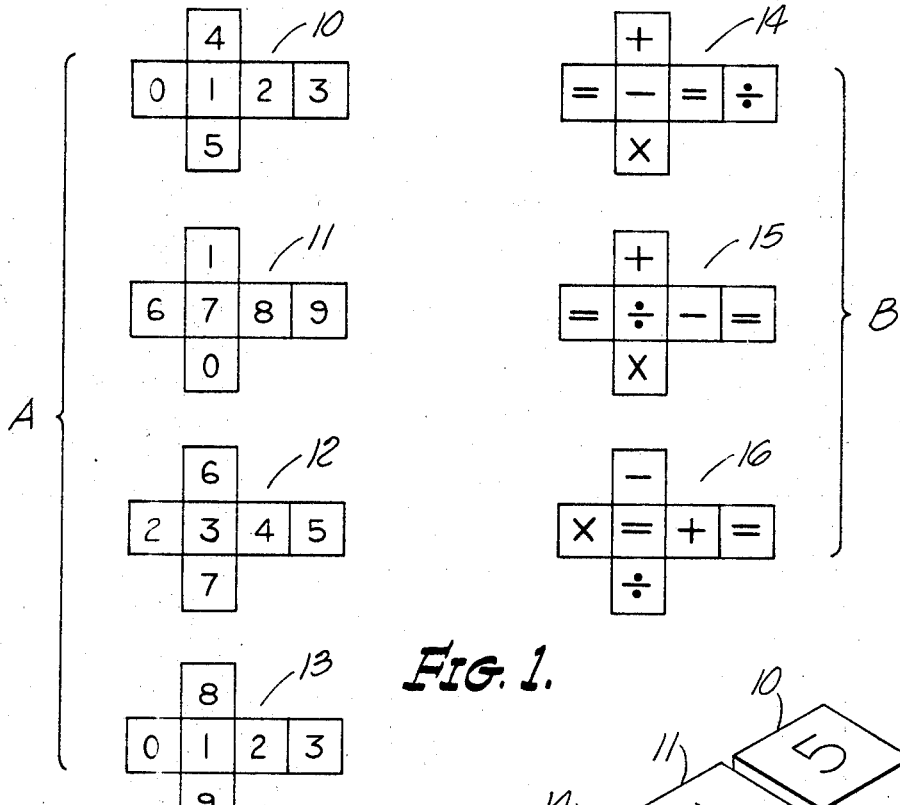
FIG. 1.
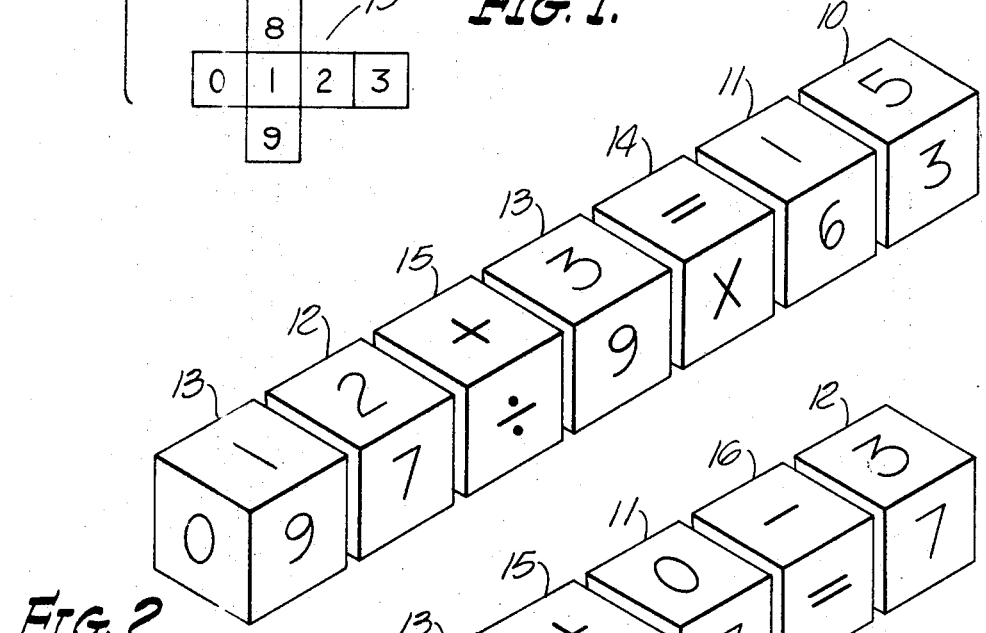
FIG. 2.
FIG. 3.
INVENTOR
JOHN R. GARDNER
BY
ATTORNEYS United States Patent Office 3,523,377
Patented Aug. 11, 1970

3,523,377
INSTRUCTIONAL GAMING APPARATUS
John R. Gardner, 7906 Laurel Grove St.,
North Hollywood, Calif. 91605
Filed Feb. 26, 1968, Ser. No. 708,186
Int. Cl. G09b 19/02
U.S. Cl. 35—31                              2 Claims

ABSTRACT OF THE DISCLOSURE

An instructional gaming apparatus for challenging the mental dexterity of one or more users and utilizing two groups of cubes one of which bears individual digits on the faces thereof and the faces of the other group of which bear arithmetical operators including a plurality of equating operators. In any play the one tossing the cubes endeavors to align the displayed digits and operators on the opposite sides of an equating operator in a manner representing a maximum value solution.

---

This invention relates to instructional and amusement devices and more particularly to a unique set of playing pieces provided on their faces with digits and symbols adapted to be used for educational, skill development and amusement purposes.

The simple apparatus provided by this invention challenges the skill and mental process of persons encompassing a wide range of ages including adults and children having at least knowledge of basic arithmetic. Not only does it possess high educational and instructional value but it also is equally meritorious in challenging the skill and mental agility of adults possessing a wide range of educational attainment.

The components comprising the apparatus include two groups of similar cubes each face of which is provided with suitable indicia, preferably comprising digits and mathematical operator symbols and adequate when properly arranged, to represent a mathematical problem and its solution. The apparatus is equally suitable for use by an individual or by a group of two or more competing individuals. The mode of use is similar in either instance, the player or players tossing the cubes upon a flat surface and then using the displayed symbols and digits to represent a problem and its solution without need for any other equipment.

Accordingly, it is a primary object of the present invention to provide instructional gaming apparatus comprising two groups of cubes each having a plurality of similar cubes one group of which is provided on its various faces with digits and the other of which is marked on its faces with mathematical operator symbols.

Another object of the invention is the provision of not less than seven similar cubes some of which are marked on their faces with separate digits and others of which are marked with mathematical operators including a plurality of faces marked with equating operators.

These and other more specific objects will appear upon reading the following specification and claims and upon considering in connection therewith the attached drawing to which they relate.

Referring now to the drawing in which a preferred embodiment of the invention is illustrated.

FIG. 1 is a developed schematic view of seven cubes each provided with a different set of indicia on the faces thereof;

FIG. 2 is a perspective view of the invention cubes typically arranged to illustrate one of the many possible plays and a possible solution for that toss of the cubes when reading the horizontally displayed symbols and digits; and FIG. 3 is a view similar to FIG. 2 but showing one of the many possible plays and solutions when reading the vertically displayed indicia.

Referring initially more particularly to FIG. 1, there is shown schematically and in exploded manner the faces of a minimum number of seven cubes designated 10 through 16. Cubes 10 through 13 comprise group A and each face of these cubes bears a single digit selected from the digits 0 through 9. It is found advantageous to employ a greater number of lower value digits than higher value. For example cubes 10 to 13 will be found to include three zeroes; three twos; three threes; and only two each of the remaining higher value digits 4 through 9.

The three cubes, 14, 15 and 16 constituting group B are provided on their faces with an arithmetical operator symbol as for example minus, plus, equal, divisor and multiplier. In distributing these symbols on the six faces of these three cubes it will be noted that the equating symbol appears twice on each of the group B cubes whereas the remaining four symbols appear a total of three times each, there being three multipliers, three minus, three plus and three divisor symbols.

Although a total of seven cubes has been disclosed and illustrated it will be obvious that interest, flexibility and complexity can be introduced by increasing the number of cubes. Desirably there is always a greater number of cubes bearing digits than there are cubes bearing operator symbols. As will be recognized, increasing the number of pieces increases the type and variety of possible solutions as well as developing the required playing skill and enhances the educational benefit to be derived.

It will be apparent from the foregoing that the described playing pieces may be employed in several ways. According to one preferred and simple mode of use the pieces are placed in a suitable container, shaken and then tossed upon a flat playing surface. Thereafter the player arranges the seven indicia facing upwardly most advantageously as, for example, in the manner illustrated in FIG. 2. According to this arrangement the problem and solution presented is the addition of 12 to 3 to provide the solution 15. If it so happens that no one of the faces of group B cubes displays the equitable symbol, then a solution is not possible and the player gains no advantage. However whenever the equating symbol is displayed then a solution is usually possible and the player may be credited with points according to any suitable scoring rules adopted or being followed by the contestants. Desirably, these rules provide for a larger score for more difficult solutions. Penalty provisions may be included in the rules in cases where an opposing player demonstrates that a higher value solution is possible after the player has announced his solution.

According to another and far more difficult and versatile mode of play, any one of the digits and symbols appearing on the verical faces of the cubes may be selected and arranged to represent the solution of a problem. A representative solution utilizing six of the seven cubes is illustrated in FIG. 3 and shows that the value of 49 divided by 7 equals 7. In this case the player chooses to discard the 7th cube.

While the particular instructional gaming apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. Instructional gaming apparatus adapted for use by one or more persons, said apparatus comprising a plurality of cubes including a first group of not less than four cubes having a digit on each face thereof, a second group of not less than three cubes having a mathematical operator on each face thereof and including at least one divisor, one multiplier, one addition, one subtraction and two equating operators on each cube of said second group, whereby if on any given toss of said cubes an equating operator is displayed the mental dexterity of the person making the toss can be exercised by arranging selected digit and operator cubes on either side of an equating operator to provide a solution to a problem.

2. Instructional gaming apparatus as defined in claim 1 characterized in that said first group of cubes includes the digits 0 through 9 with a preponderance thereof being lower value digits.

References Cited

UNITED STATES PATENTS 3,314,168   4/1967   Hechman.

FOREIGN PATENTS 420,436   4/1947   Italy.

WILLIAM H. GRIEB, Primary Examiner

U.S. Cl. X.R.

35—70; 273—146, 152.7